United States Patent [19]

Schmitz

[11] 4,455,902

[45] Jun. 26, 1984

[54] APPARATUS FOR PARTING-OFF PIECES, PARTICULARLY CANDY, FROM A STRAND OF MATERIAL, PARTICULARLY A SOFT PLASTIC STRAND OF MATERIAL

[75] Inventor: Heinz Schmitz, Hurth-Efferen, Fed. Rep. of Germany

[73] Assignee: Rose Verpackungsmaschinenfabrik Theegarten GmbH & Co., Cologne, Fed. Rep. of Germany

[21] Appl. No.: 486,059

[22] Filed: Apr. 18, 1983

[30] Foreign Application Priority Data

May 5, 1982 [DE] Fed. Rep. of Germany ....... 3216770

[51] Int. Cl.³ .................... B26D 1/28; A23G 1/20; A23G 3/06
[52] U.S. Cl. ............................ 83/150; 83/152; 83/155.1; 83/158; 83/356; 83/580
[58] Field of Search ............ 198/728, 735, 726; 83/155.1, 152, 355, 150, 356.3, 580, 158, 87; 53/550, 516; 425/310-314

[56] References Cited

U.S. PATENT DOCUMENTS

| | | | |
|---|---|---|---|
| 123,391 | 2/1872 | Giffhorn | 198/735 |
| 3,245,300 | 4/1966 | Hasten | 83/355 |
| 3,776,080 | 12/1973 | Reifenhaeuser | 83/355 |
| 3,958,390 | 5/1976 | Pringle | 53/450 |
| 4,019,624 | 4/1977 | Torres | 198/728 |
| 4,193,753 | 3/1980 | Yoshiuka | 425/311 |
| 4,341,136 | 7/1982 | Parson | 83/355 |

Primary Examiner—James M. Meister
Assistant Examiner—J. L. Knoble
Attorney, Agent, or Firm—Body, Vickers & Daniels

[57] ABSTRACT

An apparatus for parting-off pieces, particularly pieces of candy, from a strand of material, particularly a soft plastic strand of material, wherein the parted-off piece arrives on the upper side of the knife blade and is moved by this in the conveying direction so that there is practically no difference in speed between the parted-off piece and the entrainment member of a continuous conveyor engaging behind this, which conveyor pushes the parted-off pieces, with constant spacing apart, to a packing station or another further processing station. As a result, deformation and damage to the parted-off pieces is avoided during the conveying.

29 Claims, 3 Drawing Figures

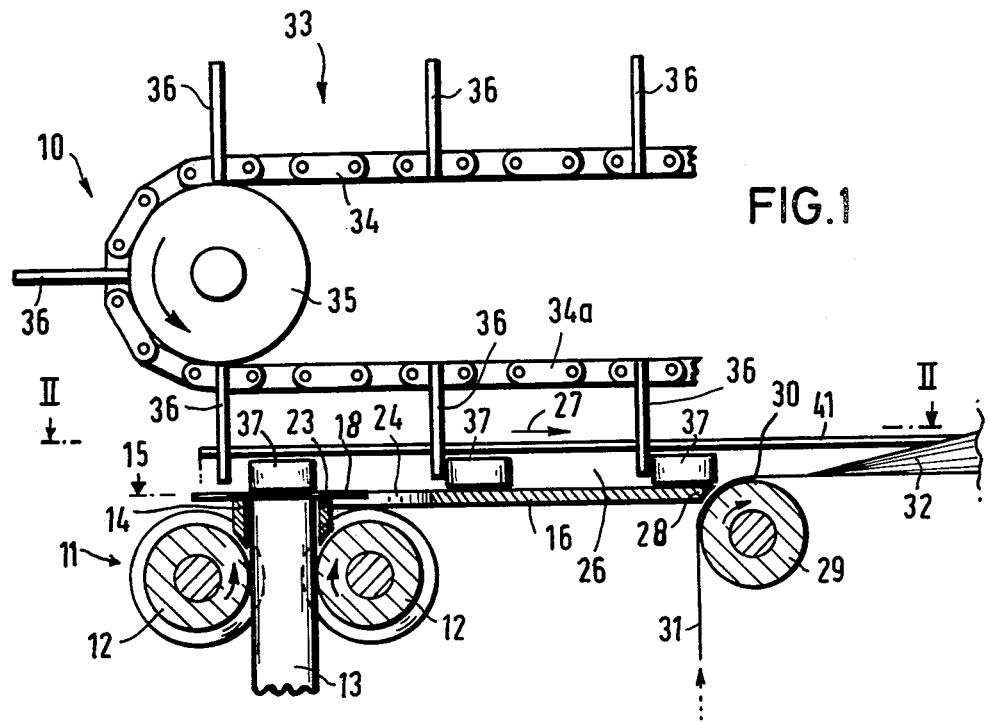

APPARATUS FOR PARTING-OFF PIECES, PARTICULARLY CANDY, FROM A STRAND OF MATERIAL, PARTICULARLY A SOFT PLASTIC STRAND OF MATERIAL

BACKGROUND OF THE INVENTION

The invention relates to an apparatus for parting-off pieces, particularly pieces of candy, from a strand of material, and for further conveying the parted-off pieces to a packing station, further processing station or the like, having a parting-off knife and a continuous conveyor which comprises entrainment means disposed spaced apart in the conveying direction, which entrainment means catch behind the parted-off pieces and push these, on a conveyor surface, to the packing station or the like.

During the further processing and packing of pressure sensitive pieces, for example pieces of candy, portions of butter or cheese, which are parted-off from a strand of material, it can happen that the parted-off pieces are deformed if they are suddenly grasped by an entrainment means of the continuous conveyor and accelerated from a standstill to a comparatively high velocity. With parted-off pieces of somewhat harder, resilient consistency, as is the case with certain candies for example, it can also happen that the particular piece of candy parted-off jumps in the conveying direction under the blow of the entrainment means gripping behind it, as a result of which the normal course of conveying is disturbed.

In order to achieve a uniform conveying stream of such pieces parted-off from a strand of material, it was therefore hitherto necessary to provide intermediate conveying devices such as bucket wheels, pushing devices working intermittently or the like, in order to bring the pieces parted-off from the strand of material, with uniform spacing and as far as possible at the same velocity, onto the continuous conveyor, so that this can supply the pieces to the further processing or packing station with constant spacing and at a constant velocity. These additional transfer devices need additional drives which are adapted to the conveying speed of the continuous conveyor and of the parting-off device. They increase the cost of the whole installation and must be regularly serviced and cleaned.

SUMMARY OF THE INVENTION

It is the object of the invention to simplify the transfer of the parted-off pieces from the parting-off device to the continuous conveyor and to construct the apparatus so that damage to or deformation even of pieces of soft plastic material does not occur during the transfer of the continuous conveyor.

This problem is solved by the invention in that the parting-off knife comprises a knife blade disposed substantially in the plane of the conveying surface, which knife blade is movable, with its cutting edge leading, in the conveying direction of the continuous conveyor to which the strand of material is supplied substantially transversely to the conveying surface.

This development has the advantage that the piece parted-off from the strand of material is already between the entrainment means of the continuous conveyor during the parting-off and is entrained by the knife blade moving in the conveying direction, the velocity of which may appropriately be adapted to the conveying speed of the continuous conveyor. The piece parted-off from the strand of material then has at least approximately the same speed as the continuous conveyor when one of its entrainment means engages behind the parted-off piece. The entrainment means then does not exert any more blows on the piece to be conveyed further, for example a piece of candy or a parted-off portion of butter, so that the parted-off piece is not deformed and also does not jump along on the conveying table.

In order to avoid specifically light, parted-off pieces sliding along the knife blade rotating further, rather than being entrained on the blade, it is advisable for the knife blade to comprise a surface portion which increases the adhesion between the knife blade and the parted-off piece on its surface adjacent to the parted-off piece. In this case, this adhesion-increasing surface portion may comprise a rough surface, particularly knurling, but it can also be provided with suction means. For this purpose, at least one through opening may be provided in the knife blade, which opening travels over a reduced-pressure chamber disposed below the knife blade so that a suction effect is exerted on the piece parted-off by the knife blade and holds the piece on the knife blade when the blade turns further.

The knife blade may appropriately be rotatable about an axis laterally beside the conveying surface and disposed transversely to this surface, and the conveying surface comprises, at its side adjacent to the knife axis, a stop for the parted-off pieces, under which the rotating knife blade slides past. The piece, which is at first entrained over a circular path by the rotating knife then slides along the stop and as a result adopts a linear movement in the same direction in which the entrainment means of the continuous conveyor are moving.

The knife blade may appropriately be constructed in the form of a sector of a circle and be mounted on the knife spindle by the tip of the sector. As a result, during a revolution of the knife blade, sufficient time remains to advance the strand of material and the piece parted-off by the knife finds sufficient room on the sector-shaped knife blade to be accelerated in the conveying direction and carried further.

The knife blade may also have two knife wings which are situated diametrically opposite one another and each of which is provided with a cutting edge. Then, during one revolution of the knife shaft, two cuts are executed one after the other. The output can be increased by this means.

Instead of a rotating knife blade, at least one knife blade which is reciprocable in the conveying direction, in the plane of the conveying surface, can be provided in part-off pieces from the strand of material, and it is also possible to provide a counterknife which cooperates with the knife blade during the parting-off of the pieces in the manner of shears.

The conveying surface and the knife blade may appropriately be disposed substantially horizontally. This has the advantage over a vertical arrangement, which is also possible, that the moving knife blade forms a conveying table for the parted-off piece, on which it is first set in motion without friction before it is grasped by the entrainment means of the continuous conveyor and pushed over its conveying surface.

With certain starting materials, it may be an advantage if the strand of material is supplied to the parting-off knife through a guide passage, the free edge of which lies in the plane of the conveying surface and forms a counter-cutting edge for the knife blade.

BRIEF DESCRIPTION OF THE DRAWINGS

Further features and advantages of the invention are apparent from the following description of particularly appropriate embodiments of the invention which are shown in detail by the drawings in which:

FIG. 1 shows an apparatus for parting-off and further conveying pieces of candy according to the invention, in a diagrammatic side view;

FIG. 2 shows the subject of FIG. 1 in a horizontal section on the line 2—2; and, FIG. 3 shows another form of embodiment of the knife blade used in the parting-off device, in plan view.

DESCRIPTION OF PREFERRED EMBODIMENTS

In the drawings, an apparatus for parting-off pieces of candy from a strand of material and for further conveying the parted-off pieces to a wrapping device is designated by 10. The apparatus 10 consists of a feed device 11 which comprises two feed rollers 12 which rotate in opposite directions and are disposed spaced apart and which push a strand of material 13, in the present case a soft plastic candy material, upwards through a cylindrical guide passage 14 which is immediately above the feed rollers 12 and ends in the plane 15 of a conveying surface 16 which is formed by a conveying table disposed horizontally.

Above the feed rollers 12 of the feed device 11 there is a parting-off knife 17 with a knife blade 18 in the form of a sector of a circle which is secured by the tip 19 of its sector to a knife spindle 20 which is mounted for rotation laterally beside the conveying surface 16 and perpendicular to this conveying surface, in a bearing arrangement not illustrated here. The knife blade 18 of the parting-off knife 17 rotates in clockwise direction in FIG. 2, in the direction of the arrow 21, and in the course of this slides, with its knife edge 22 leading, past the upper edge 23 of the guide passage 14 which forms a countercutting edge for the knife blade 18.

In the region of the knife blade 18, which lies in the plane 15 of the conveying surface 16, the conveying table 16 has an arcuate excision 24 past the edge of which the circumferential edge 25 of the knife blade 18 slides with slight spacing.

Provided above the conveying surface 16, at both sides, are stop bars 26 which extend in the longitudinal direction of the conveying surface and are connected to cover plates 41 which leave an elongated slot 42 free between them and together with the stop bars 26 and the conveying surface 16 form a substantially closed conveying passage.

At the rear end 28 of the conveying surface 16 in the direction of conveying 27 there is a guide and feed roller 29, the generated surface 30 of which lies in the plane 15 of the conveying surface 16 and over which there runs a web 31 of wrapping paper which moves in the plane 15 of the conveying surface 16, in the conveying direction 27, and the edges of which are aligned and folded over by guide plates 32 disposed laterally so that the strip of paper 31 supplied via the guide roller 29 is formed into a tube as is known per se in the packing art.

Disposed above the conveying surface 16 is a continuous conveyor 33 which is formed from an endless conveyor chain 34 which runs around drive and guide rollers 35, only one of which is illustrated in the drawing. Secured to the conveyor chain 34 at regular intervals are entrainment means 36b which extend outwards and, in the region of the lower strand 34a of the conveyor chain 34, project into the elongated slot 42 of the conveying passage for the pieces 37 parted-off from the strand of material and end immediately above the conveying surface 16.

It can be seen from FIG. 2 that the knife blade 18 comprises a first surface portion 43a following on the cutting edge 22 and a second surface portion 43b following on this in the circumferential direction. The first surface portion 43a has a smooth surface and its width in the circumferential direction in the region of the pieces 37 to be parted-off is as large as the diameter of the strand of material 13 from which the pieces 37 are parted-off. The following surface portion 43b of the knife blade 18 has knurling 44 extending radially, as a result of which a rough surface results and the friction between this surface portion 43b and the underside of the parted-off piece 37 is increased.

Naturally, other means may also be used to increase the static friction. For example, the surface of the surface portion 43b may comprise small hooks or prongs, knubs or globules stuck on, if this is compatible with the product to be conveyed.

The mode of operation of the apparatus is as follows. A piece 37 is parted-off from the strand of material 13 advanced by the feed rollers 12 over the plane 15 of the conveying surface 16 by the knife blade 18 rotating in the direction of the arrow 21 every time the cutting edge 22 of the knife blade 18 slides along the edge 23 of the guide tube 14, acting as a countercutting edge. When the cut is effected, the parted-off piece 37 reaches the surface of the parting-off knife 17 and is carried further by this, while the knife blade 18 turns further until the parted-off piece 37 is halted by the stop bar 26 while the knife blade 18 moves further under the stop bar.

It can be seen from FIGS. 1 and 2 that the piece of candy 37 is parted-off from the strand of material 13 between two entrainment means 36 of the continuous conveyor 33 which are moved in the conveying direction 27 by the conveyor chain 34 over the knife blade 18 and the conveying surface 16. The forward speed of the conveyor chain 34 is adapted to the speed of rotation of the parting-off knife 17, so that the piece lying on the knife blade 18 and parted-off by this and the entrainment means 36 disposed behind it in the conveying direction 27 move in the conveying direction 27 at substantially the same speed. Accordingly there is no difference or only a very slight difference in speed between the parted-off piece 37 and the entrainment means disposed behind it when the parted-off piece 37 is stripped off the knife blade 18, rotating further, at the stop bar 26 and the entrainment means 36 disposed behind it in the conveying direction 27 grasps the parted-off piece 37 and pushes it further in the conveying direction 27 on the conveying surface 16.

The parted-off pieces 37 pushes along the conveying surface 16 by the entrainment means 36 then reach the end 28 of the conveying surface 16 and the web of paper 31 traveling in the conveying direction 27 which entrains them like a belt conveyor and is folded over them at the guide plates 32 so that they are conveyed further to the packing and closing station as in a tube. There the paper envelope is cut through in known manner between the individual pieces 37 and folded over or twisted at the ends of the wrapped pieces, as is known per se.

Another form of embodiment of the parting-off knife 17 is shown in FIG. 3, wherein the knife blade 18 comprises two knife wings 18a and 18b situated diametrically opposite one another and is rigidly connected to the knife shaft 40 which rotates about the knife axis 20.

In order to ensure a reliable entrainment of the parted-off piece by the knife blade 18 in this form of embodiment also, a through opening 34, for example a bore, is provided in each knife blade 18a and 18b, which bore is at the same radial distance r from the knife axis 20 as the strand of material 13 or the piece 37 parted-off from the cutting edge 22 of the particular knife wing 18a or 18b which corresponds to the diameter of the parted-off piece 37. Below the knife blade 18 there is a low-pressure box 46 which is connected to a vacuum pipe not illustrated here and comprises, at its top, an opening 47 over which the openings 45 slide when the knife blade 18 rotates away over the low-pressure box 46 and its underside slides with a sealing action along the top of the low-pressure box 46. As soon as the piece 37, indicated in broken lines in FIG. 3, has been parted-off from the strand of material 13 and assumes the position illustrated in FIG. 3, it slides a little in the circumferential direction on the knife blade 18 turning further in the conveying direction, until it covers the opening 45. On further rotation, this opening 45 has come within the region of the opening 47 in the low-pressure box 46 so that the piece 37 lying over the opening 45 is firmly held on the surface of the knife blade 18 by suction and is entrained by this in the circumferential direction until it strikes against the stop bar 26 and is conveyed further by one of the entrainment means on the conveying surface 16.

Instead of the parting-off knife with a rotatable knife blade, a knife blade may also be used which is reciprocated in the conveying direction 27 in the plane 15 of the conveying surface 16 and is guided, for example, and slides between the stop bars 26 and the upper edge 23 of the guide tube 14.

In a further form of embodiment, not illustrated here, two parting-off knives may be provided which move in relation to one another in the manner of shears and at the same time pivot about a point situated outside the conveying surface 16, so that the piece parted-off by the parting-off knives is conveyed further in the conveying direction 27 before it is grasped by an entrainment means and pushed further on the conveying surface 16.

The invention is not restricted to the forms of embodiment illustrated and other modifications and additions are possible without departing from the scope of the invention. For example, it is possible to dispose the parting-off knife immediately above the conveying surface for sliding away over this and to provide a rectangular or square guide tube to guide the strand of material to be advanced. Furthermore, the parted-off pieces may also be supplied to another further processing station. Although the apparatus according to the invention is particularly suitable for parting-off pieces of candy from a strand of material, it can nevertheless also be used for parting-off portions of a pasty product from a strand of material, for example butter, cake dough, dripping and fat.

I claim:

1. Apparatus for parting-off pieces from a strand of material and conveying the parted-off pieces in a conveying direction along a conveying surface comprising, means providing an elongate conveying surface, means to displace said strand transverse to said conveying surface, a parting-off knife comprising driven knife blade means disposed in the plane of said conveying surface and having cutting edge means disposed in said plane and displaced in said conveying direction to part-off pieces from said strand, and driven continuous conveyor means including entrainment means spaced apart and displaced in the conveying direction for engaging behind parted-off pieces and displacing the pieces along said conveying surface.

2. Apparatus according to claim 1, wherein said knife blade means is rotatable about an axis disposed laterally beside and transverse to said conveying surface, and said conveying surface includes stop means at its side adjacent to said axis and overlying said blade means.

3. Apparatus according to claim 1, wherein said knife blade means is rotatable and in the form of a sector of a circle having an axis of rotation transferse to said conveying surface.

4. Apparatus according to claim 1, wherein said knife blade means is rotatable about an axis transverse to said conveying surface and comprises two diametrically opposed blade elements.

5. Apparatus according to claim 1, wherein said knife blade means includes first and second blade edges displaceable relative to one another to part-off pieces from said strand.

6. Apparatus according to claim 1, wherein said conveying surface and said knife blade means are disposed substantially horizontally.

7. Apparatus according to claim 1, and guide passage means for said strand of material, said guide passage means including edge means lying in the plane of said conveying surface and providing a countercutting edge for said knife blade means.

8. Apparatus according to claim 1, wherein said knife blade means includes a surface portion in said plane and facially engaging a parted-off piece, and means increasing the adhesion between said surface portion of said knife blade means and the parted-off piece.

9. Apparatus according to claim 8, wherein said means increasing adhesion is knurling means on said surface portion.

10. Apparatus according to claim 8, wherein said means increasing adhesion comprises opening means in said surface portion, and suction means on the side of said knife blade means opposite said surface portion.

11. Apparatus according to claim 10, wherein said opening means includes at least one opening through said surface portion, and said suction means includes a low pressure chamber across which said opening moves.

12. Apparatus according to claim 1, wherein said knife blade means is rotatable about an axis disposed laterally beside and transverse to said conveying surface, and said conveying surface includes stop means at its side adjacent to said axis and overlying said blade means, said blade means being in the form of a sector of a circle rotatable about said axis.

13. Apparatus according to claim 12, wherein said conveying surface and said knife blade means are disposed substantially horizontally.

14. Apparatus according to claim 13, and guide passage means for said strand of material, said guide passage means including edge means lying in the plane of said conveying surface and providing a countercutting edge for said knife blade means.

15. Apparatus according to claim 14, wherein said knife blade means includes a surface portion in said plane and facially engaging a parted-off piece, and means increasing the adhesion between said surface portion of said knife blade means and the parted-off piece.

16. Apparatus according to claim 15, wherein said means increasing adhesion is knurling means on said surface portion.

17. Apparatus according to claim 15, wherein said means increasing adhesion comprises opening means in said surface portion, and suction means on the side of said knife blade means opposite said surface portion.

18. Apparatus according to claim 12, wherein said knife blade means includes a surface portion in said plane and facially engaging a parted-off piece, and means increasing the adhesion between said surface portion of said knife blade means and the parted-off piece.

19. Apparatus according to claim 18, wherein said means increasing adhesion is knurling means on said surface portion.

20. Apparatus according to claim 18, wherein said means increasing adhesion comprises opening means in said surface portion, and suction means on the side of said knife blade means opposite said surface portion.

21. Apparatus according to claim 1, wherein said knife blade means is rotatable about an axis disposed laterally beside and transverse to said conveying surface, and said conveying surface includes stop means at its side adjacent to said axis and overlying said blade means, said blade means comprising two diametrically opposed blade elements rotatable about said axis.

22. Apparatus according to claim 21, wherein said conveying surface and said knife blade means are disposed substantially horizontally.

23. Apparatus according to claim 22, and guide passage means for said strand of material, said guide passage means including edge means lying in the plane of said conveying surface and providing a countercutting edge for said knife blade means.

24. Apparatus according to claim 23, wherein said knife blade means includes a surface portion facially engaging a parted-off piece, and means increasing the adhesion between said surface portion of said knife blade means and the parted-off piece.

25. Apparatus according to claim 24, wherein said means increasing adhesion is knurling means on said surface portion.

26. Apparatus according to claim 24, wherein said means increasing adhesion comprises opening means in said surface portion, and suction means on the side of said knife blade means opposite said surface portion.

27. Apparatus according to claim 21, wherein knife blade means includes a surface portion facially engaging a parted-off piece, and means increasing the adhesion between said surface portion of said knife blade means and the parted-off piece.

28. Apparatus according to claim 27, wherein said means increasing adhesion is knurling means on said surface portion.

29. Apparatus according to claim 27, wherein said means increasing adhesion comprises opening means in said surface portion, and suction means on the side of said knife blade means opposite said surface portion.

* * * * *